United States Patent [19]

Van Erden et al.

[11] 4,428,720
[45] Jan. 31, 1984

[54] APPARATUS FOR PRODUCING POLYPROPYLENE SHEET

[75] Inventors: Donald L. Van Erden, Wildwood; Russell J. Gould, Mount Prospect; Yukio A. Matsunaga, Chicago, all of Ill.

[73] Assignee: Signode Corporation, Glenview, Ill.

[21] Appl. No.: 343,501

[22] Filed: Jan. 28, 1982

Related U.S. Application Data

[62] Division of Ser. No. 138,491, Apr. 22, 1980, abandoned.

[51] Int. Cl.³ .................................................. B29D 7/02
[52] U.S. Cl. .................................... 425/66; 83/425.1; 425/296; 425/404
[58] Field of Search ................. 425/66, 296, 404, 446; 83/425.1, 425.2, 425.3, 425.4, 922

[56] References Cited

U.S. PATENT DOCUMENTS

| | | |
|---|---|---|
| 3,394,045 | 7/1968 | Gould . |
| 3,582,453 | 6/1971 | Sloan et al. ............................ 425/66 |
| 3,762,250 | 10/1973 | Huskey ............................... 83/425.1 |
| 3,794,118 | 2/1974 | Bauch .................................... 165/90 |
| 4,140,740 | 2/1979 | DeSmedt et al. .................... 264/146 |

FOREIGN PATENT DOCUMENTS

| | | |
|---|---|---|
| 693027 | 8/1964 | Canada . |
| 1504890 | of 0000 | Fed. Rep. of Germany . |
| 2022313 | of 0000 | Fed. Rep. of Germany . |
| 2115849 | of 0000 | France . |
| 2287983 | of 0000 | France . |
| 2297126 | of 0000 | France . |
| 2360402 | of 0000 | France . |
| 46-36239 | 10/1971 | Japan ................................ 83/425.1 |
| 456933 | of 0000 | Switzerland . |
| 687545 | 5/1964 | United Kingdom . |
| 1457940 | 12/1976 | United Kingdom . |
| 1502641 | 3/1978 | United Kingdom . |

OTHER PUBLICATIONS

Translation of Swiss Doc. No. 456,933, Col. 2, line 26—Col. 3, line 23.

Primary Examiner—James B. Lowe
Attorney, Agent, or Firm—Dressler, Goldsmith, Shore, Sutker & Milnamow, Ltd.

[57] ABSTRACT

Apparatus is provied for forming an abrasion resistant sheet from a sheet of orientable thermoplastic polymer material in one continuous production line apparatus. Apparatus is also provided for treating the surface of an oriented sheet with heated rolls for creating a fused surface layer on each side of the sheet.

8 Claims, 5 Drawing Figures

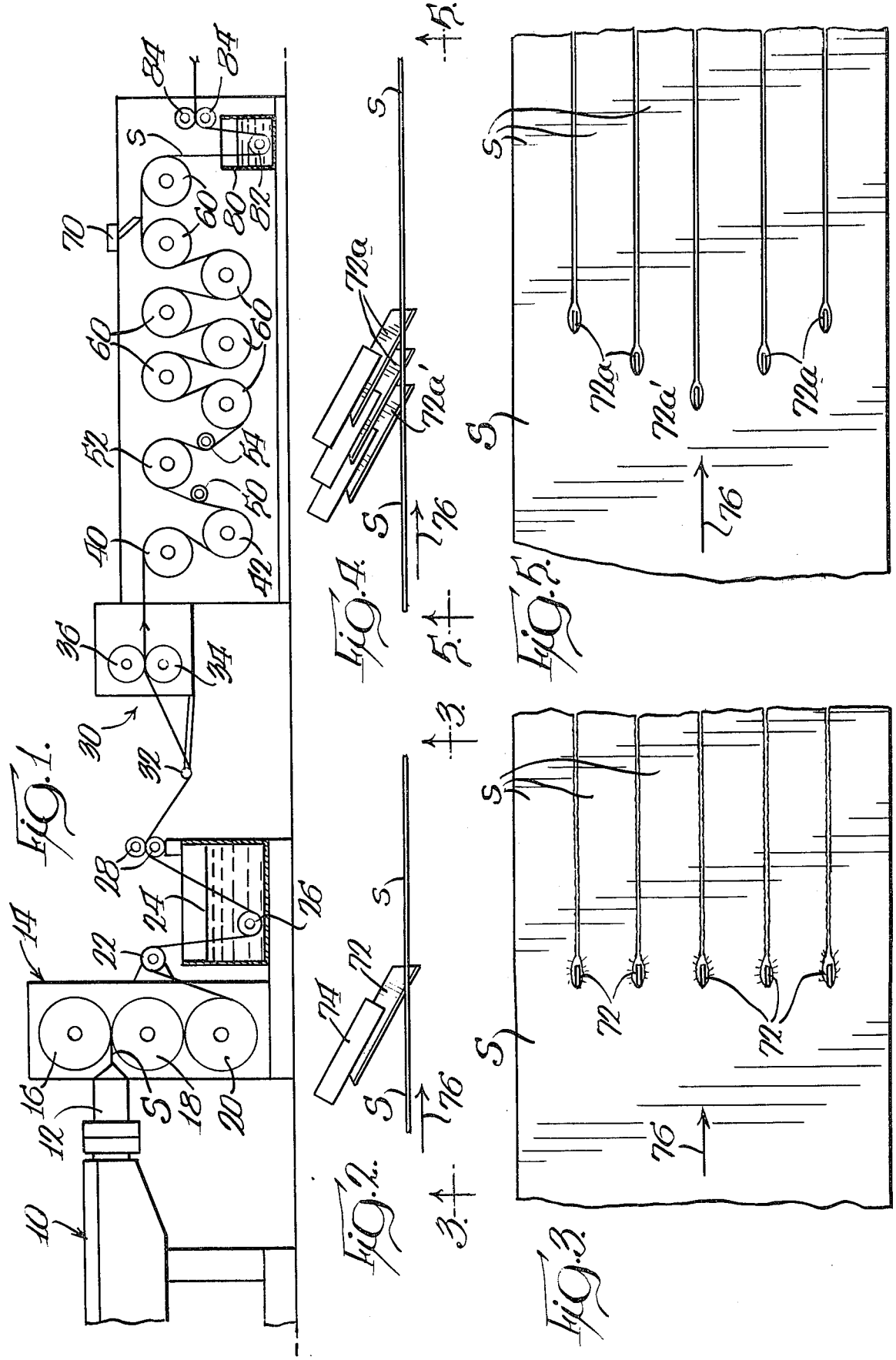

APPARATUS FOR PRODUCING POLYPROPYLENE SHEET

This is a division of application Ser. No. 138,491, filed Ap. 22, 1980, now abandoned.

DESCRIPTION

1. Technical Field

This invention relates to the production of a sheet form of thermoplastic polymer, and includes, among other things, the working of the material in a sheet to obtain an orientation of the macromolecular chains, the surface treatment of the oriented sheet, and the cutting of the sheet to form smaller sheets.

2. Background of the Invention

Techniques for producing improved strength sheet material that has an orientation of the macromolecular chains, such as a uniplanar, axial oriented crystalline structure, are known. For example, see the U.S. Pat. Nos. 3, 354,123, 3,394,045 and 3,651,196.

The inventors of the invention described and claimed herein know of commercially practiced processes which are subsequently applied to such oriented sheet, on a separate process line and apparatus, to treat the surface of the product in sheet form so as to increase the abrasion resistance of the sheet. The inventors are also aware of commercial processes that subsequently slit the sheet material into a plurality of narrower sheets or strips suitable for use as strap for binding articles.

The inventors of the invention described and claimed herein are also aware of commercial processes for fabricating a single narrow strip of polypropylene material having an oriented structure suitable for use as strap for binding articles. However, such strap produced by some manufacturers is not of sufficiently uniform thickness throughout the length of the strap as is desired in some applications. For example, it is sometimes desired to use such strap in high speed automatic strapping machines that feed the strap around an article, tension the strap tight about the article, and then heat weld or fuse the overlapping strap ends together. But, a strap with a non-uniform thickness across its width and/or throughout its length is more likely to be improperly fed by the machine and the fusing of the overlapping strap ends is more likely to result in an unsatisfactory joint.

SUMMARY OF THE INVENTION

In one embodiment of the method of the present invention, an abrasion resistant sheet is produced from a sheet of unoriented, thermoplastic polymer material, such as a polyesther or linear crystallizable polypropylene material. The sheet is produced in one continuous process which can be effected by a single, compact, highly efficient, and low cost production line.

According to one form of the apparatus of the present invention, a polyesther or crystallizable polypropylene sheet material which has been mechanically worked to obtain an orientation of the macromolecular chains is contacted by novel, heated, surface treatment rolls to heat the sheet for a sufficient time to cause fusion in the side surfaces of the sheet to a depth of at least 0.1 mil, but insufficient to cause fusion in the entire thickness of the sheet. This increases the abrasion resistance of the sheet.

According to another aspect of the invention, a sheet of an oriented thermoplastic polymer material, such as polypropylene, is slit at a temperature greater than 100° F. by a plurality of staggered, fixed, inexpensive, cutting blades in a direction substantially parallel to the sheet feed direction to produce a plurality of narrower sheets or strips.

In accordance with another aspect of the invention, a method and apparatus are provided for treating an oriented thermoplastic polymer, such as polypropylene strap, which has a non-uniform thickness. The undesirable non-uniform thickness is eliminated according to the present invention by providing a pair of spaced-apart, oppositely rotating, heated cylindrical rolls and by feeding the strap in a continuous path partially around and in contact with each roll. One surface of the strap is thus contacted with one roll and the other surface of the strap is thus contacted with the other roll. The rolls are maintained in contact with the strap while maintaining the strap under a tension whereby the surfaces of the strap become substantially uniformly flat and parallel throughout the length of the strap.

The novel combination of elements in accordance with the method and apparatus of the present invention are thus seen to yield desirable and beneficial results—results which are not only new and different, but which also provide a substantial improvement over the prior art.

Numerous other advantages and features of the present invention will become readily apparent from the following detailed description of the invention and of embodiments thereof, from the claims and from the drawings.

BRIEF DESCRIPTION OF THE DRAWINGS

In the accompanying drawings forming part of the specification and in which like numerals are employed to designate like parts throughout the same, FIG. 1 is a simplified, schematic view of apparatus for effecting the method of the present invention;

FIG. 2 is an enlarged, fragmentary, side view of an unsatisfactory method for slitting a sheet of an oriented polypropylene material;

FIG. 3 is a bottom view taken generally along the plane 3—3 of FIG. 2;

FIG. 4 is an enlarged, side view of an apparatus for slitting the sheet material in accordance with the teachings of the present invention; and FIG. 5 is a bottom view taken generally along the plane 5—5 of FIG. 4.

DESCRIPTION OF THE PREFERRED EMBODIMENT

While this invention is susceptible of embodiment in many different forms, there are shown in the drawings and will herein be described in detail preferred embodiments and process parameters of the invention. It should be understood, however, that the present disclosure is to be considered as an exemplification of the principles of the invention and is not intended to limit the invention to the embodiments illustrated or to the process parameter values listed.

The precise shapes and sizes of the components herein described are not essential to the invention unless otherwise indicated.

For ease of description, the apparatus of this invention will be described in normal operating position, and terms such as upper, lower, horizontal, etc. will be used with reference to its normal operating position. It will be understood, however, that the apparatus of this invention may be manufactured, stored, transported, used, and sold in an orientation other then the normal operating position described.

The apparatus of this invention has certain conventional mechanisms, such as drive mechanisms, control mechanisms, tension sensing mechanisms, etc., the details of which, though not fully illustrated or described, will be apparent to those having skill in the art and an understanding of the necessary functions of such mechanisms.

A novel method and aparatus for manufacturing an orientable thermoplastic polymer sheet, such as a polyesther or polypropylene sheet, in a single continuous and compact line is illustrated by means of a greatly simplified schematic representation in FIG. 1. The method and apparatus is directed to fabricating a sheet of the orientable thermoplastic polymer, mechanically working the sheet to obtain an orientation of the macromolecular chains, treating the surface of the sheet to increase abrasion resistance, and slitting the sheet to provide narrower sheets. Portions of the line may also be used to treat plastic strapping that has a non-uniform cross sectional thickness throughout its length so as to orient the opposing side surfaces of such a strap in a substantially uniformly parallel configuration throughout the length of the strap.

The method and apparatus will be explained with refeence to a specific example involving polypropylene. There is no intention that the invention be limited to the material or specific conditions set forth.

According to the present invention, polypropylene sheet material may be formed or extruded from the raw materials under the conditions described in detail in the aforementioned U.S. Pat. No. 3,394,045. For a full understanding of the nature and operation of the formation of such a sheet material, reference may be had to that patent. In this description, only such information as is relevant to the present invention will be described, and only in sufficient detail as to afford an understanding of the present invention. However, the entire disclosure of the U.S. Pat. No. 3,394,045, insofar as it is consistent with the present disclosure, is hereby incorporated in and made a part of this application by reference thereto. Such modifications as are necessary to adapt the teachings set forth in that patent to the present invention are described in detail hereinafter.

With reference to FIG. 1, a conventional plastic extruder 10 is fed a suitable raw material, such as isotactic polypropylene granules. The granules are rendered plastic or flowable by heating to a sufficient temperature, say approximately 490° F.

Preferably, the material is extruded through a conventional sheet die 12 at a pressure of approximately 2000 pounds per square inch to extrude a web, workpiece, or sheet S having a suitable width, for example, three inches, and having a suitable thickness, for example, 0.165 inch. These dimensions are suitable for producing an ultimate sheet product that can be used as strapping.

The sheet S is passed through a conventional casting roll assembly 14 comprising an upper roll 16, a middle roll 18 and a bottom roll 20. Preferably, the rolls are maintained at about 150° F. For this purpose, the rolls may contain internal passages allowing the circulation of a heat transfer of fluid therethrough.

After exiting from the casting roll assembly 14, the sheet S is trained over a guide roll 22 and down into a tank 24 containing a bath of liquid, such as water, for reducing the temperature of the sheet to a substantially uniform value throughout its transverse cross-section.

The sheet is trained around a guide roll 26 in the tank 24 and conveyed upwardly therefrom out of the tank 24 between draw rolls 28. The sheet is then conveyed to a rolling mill assembly 30 which incorporates, on its upstream side, an adjustable tension speed controlling dancer roll 32. The dancer roll 32 is preferably at ambient temperature. The dancer roll speed control may be of conventional design and may be operated through conventional controls to establish a desired speed in that region of the sheet conveying path.

The rolling mill assembly 30 includes a pair of opposed, oppositely rotating compression rolls 34 and 36. The compression rolls may be of conventional design for causing flow of the material in the sheet S in the direction of the feeding of the sheet in the path thereby causing production of a sheet of reduced cross-sectional thickness as the sheet exits from the nip of the rolls. The compression rolls 34 and 36 are preferably maintained at a temperature in the range of between 100° F. and 220° F.

The sheet S exiting from the rolling mill assembly 30 is next trained about a pair of oppositely rotating chill rolls 40 and 42 which are preferably maintained at a temperature of about 85°. The chill rolls are rotated at a higher surface velocity than the upstream compression rolls 34 and 36.

The chill rolls 40 and 42 are operated at a higher speed to create a further orientation of the sheet between the nip of the compression rolls 34 and 36 and the chill rolls 40 and 42. The increased tension is preferably maintained in the range of between 10 and 350 pounds per inch of sheet width to create an orientation of the macromolecular chains in the polypropylene material. The orientation may be a generally planar orientation. The sheet may have a uniplanar, axial oriented crystalline structure of increased strength or some other increased strength structure resulting from a tension induced orientation.

Although it is not necessary to convey the sheet through the compression rolls 34 and 36 ahead of the chill rolls 40 and 42 to reduce the cross-sectional thickness of the sheet during the application of higher tension by the chill rolls, it has been found that the use of such compression and the resulting sheet thickness reduction decreases the degree of brittleness of the formed sheet. That is, if the sheet is not compressed and reduced in cross-sectional thickness by the rolls 34 and 36, the oriented sheet produced is more brittle than a sheet that is first compressed by the rolls 34 and 36.

The resulting brittleness in the final sheet product is dependent upon, among other things, the type of polypropylene feed material that is used. It has been found that more expensive types of polypropylene feed material will produce an oriented sheet that is not as brittle as sheet produced with less expensive types of feed material. However, it has been found that if the less expensive feed material is used, the degree of brittleness in the formed sheet can be substantially reduced if the sheet is first compressed, as with rolls 34 and 36. This permits the use of less expensive feed materials for producing oriented sheet with an acceptable brittleness level that was only heretofore possible by using the more expensive feed materials.

The oriented polypropylene sheet is fed from the chill rolls 40 and 42 to a surface treatment station which includes (1) a first, heated, surface treatment roll 50 adapted to contact one side surface of the sheet, (2) a guide roll 52, and (3) a second, heated, surface treatment roll 54 adapted to contact the other side surface of the sheet.

The surface treatment rolls 50 and 54 function to raise the temperature of the surface layer of the sheet to a fusion temperature, generally in the range of between about 350° F. and about 525° F. The surface layer may be fused for a depth of between about 0.1 mil and about 3 mils but generally the fusion layer obtains a thickness of about one mil. This fusion treatment of the surface of the sheet increases abrasion resistance. The guide roll 52 is preferably maintained at about 85 degrees F. between the two surface treatment rolls 50 and 54.

The tendency of oriented polypropylene sheet to abrade is more fully disclosed in the aforementioned U.S. Pat. No. 3,394,045 and attention is directed thereto for a complete discussion of the problem and for a complete discussion of how fusing the surface layer of the sheet mitigates this problem.

The aforementioned U.S. Pat. No. 3,394,045 suggests that the sheet of oriented polypropylene material may be heated and the surface fused by contact with a gas flame-heated roll. In accordance with the present invention, the novel rolls 50 and 54 are heated and maintained in contact with the strap in a manner sufficient to form the fusion layer in the sheet. Specifically, each roll 50 and 54 is preferably cylindrical in shape, fabricated from aluminum or cold rolled steel, has a diameter of about three inches, and contains passages permitting the circulation of a heat transfer fluid, such as oil, at a temperature of between about 350° F. and 700° F.

Each roll 50 and 54 is in contact with the sheet so as to effect, in combination with the other rolls, a total tension in the sheet along the feeding direction of greater than ten pounds per inch of sheet width section and preferably between about 10 and 350 pounds per inch of sheet width for sheet having a thickness of between 0.005 inch and 0.035 inch.

The sheet is fed in a path partially around the circumference of each roll for an arc length sufficient to produce the desired surface fusion layer for the selected sheet speed, roll temperature and roll diameter.

Within the parametric ranges described above a contact arc angle of between 40° and 80° with a sheet conveying speed in the range of about 50 and 350 feet per minute has been found to function satisfactorily. It is believed that lower and higher speeds, including speeds of 600 feet per minute or more, will also function satisfactorily.

After exiting from the surface treatment station, the sheet is trained around a plurality of heated rolls 60 which function to stress relieve the sheet to stabilize the oriented polypropylene material. The heat treatment of oriented polypropylene material to effect the stabilization is well known in the art and is not discussed in detail here. However, in one form of the heat treatment, each of the stress relieving rolls 60 is maintained at about 300 degrees F.

In the stress relieving section of the line, the tension on the strap may be suitably controlled, by conventional techniques, as necessary to effect proper stress relieving without substantially deleteriously effecting the orientation of the polypropylene material in the sheet.

Oriented polypropylene sheet material is difficult to slit along the feeding direction to form a narrower sheet for strapping. According to one aspect of the present invention, a simple, inexpensive, and novel method and apparatus for slitting such sheet material is provided. Preferably, the slitting means is located in the stress relieving or stabilization region of the process line, and in FIG. 1, is located between the last two stress relieving rolls 60 where it is designated generally by numeral 70.

The inventors of the present invention have developed a method to slit oriented polypropylene sheet with stationary cutters or blades, since such stationary cutters are simpler and less expensive than the conventional rotary cutters in common use. One approach to attempting to slit oriented polypropylene sheet is illustrated in FIGS. 2 and 3. A plurality of blades 72 is provided with each blade 72 mounted in a separate holder 74. The blades 72 may be of conventional razor edge design and may be about 1/16 inch thick. The blades 72 extend into the sheet feed path in the plane of the sheet S which is moving in the direction indicated by the arrow 76.

The sheet material between the blades is cut into strips s and forced on either side of each blade toward an adjacent blade. This causes a small amount of transverse buckling of the sheet and can jam the sheet between the blades. This can overheat the blades and can lead to the production of rough and uneven edges along the resulting narrower sheets. Further, the jamming of the sheet between the blades can create excessive back tension in the sheet on the process line. Also, the transverse buckling of the sheet can lead to an undesired variation in the width of each individual narrower sheet or strap that is thus formed.

Additionally, when attempting to slit a sheet of oriented polypropylene material at high speeds, there is a tendency for the sheet to crack in the direction upstream from the edge of the knife or blade parallel to the sheet feed direction.

The inventors of the present invention have found that the above-described undesirable problems can be substantially reduced or eliminated altogether if the sheet to be slit by cutting means is maintained at a temperature greater than 100 degrees F. and preferably at a temperature of above 180 degrees F.

Further, some of the above-described undesirable problems are substantially eliminated if the sheet is slit under a tension in the feed direction in the range of between 5 and 350 pounds per inch of transverse width of the unslit sheet. Preferably, under such tension conditions, the unslit sheet has a thickness in the range of between 0.005 inch and 0.035 inch.

Also, it has been found that some of the above-described problems are eliminated or substantially mitigated if the slitting means includes a plurality of spaced-apart knife or razor-type blades adapted to extend into the feed path in the plane of the sheet with the adjacent blades being staggered relative to a line in the sheet plane that is transverse to the direction of the feed path as best illustrated in FIGS. 4 and 5 for blades 72a. Specifically, with reference to FIG. 5, the blades are preferably disposed in a V-shaped array across the path of the sheet with one of the blades, 72a', forming the vertex of the angle defined by the V-shaped array and with the one vertex blade 72a' being disposed substantially in the center of the transverse width dimension of the sheet in the path. Further, the vertex blade 72a' is preferably located furthest upstream of the remainder of the array of blades relative to the feeding of the sheet.

With the above-described staggered blade configuration, the sheet material on either side of an individual knife blade is free to "flow" transversely a small amount without impinging upon an adjacent blade. Thus, the tendency for the sheet to buckle transversely or jam between the blades is substantially reduced or eliminated.

Configurations of the staggered blades other than the illustrated V-shape may be employed so long as each blade is not in direct transverse alignment across the sheet relative to adjacent blades.

Following the slitting of the sheet by the slitting means 70 at the location illustrated in the schematic diagram of FIG. 1, the narrower sheets or strips s are guided around the last stress relieving roll 60 and around guide roll 82 through a tank 80 containing a heat transfer fluid, such as water, for cooling the strips to a desired temperature or to ambient temperature.

The strips are withdrawn from the tank 80 along the feed path between draw rolls 84 which may be maintained at a suitable temperature at ambient or below, and preferably at about 50 degrees F. From the draw rolls 84, the strips may be wound on separate storage spools (not illustrated) or otherwise removed as may be desired.

It has been found that the above-described surface treatment rolls 50 and 54 may function, in addition to providing the fused surface layer, to treat previously fabricated oriented polypropylene strap that has a non-uniform thickness across its width and/or along its length. Specifically, it has been found that contacting such non-uniform thickness strap with the rolls 50 and 54 under the process parameters described above for those rolls, causes the surfaces of the strap to become substantially uniformly flat and parallel throughout the length of the strap. Such improved strap is less likely to jam an automatic plastic strapping machine and is more likely to form a satisfactory fusion weld after being looped and tensioned about an article.

From the foregoing, it will be observed that numerous variations and modifications may be effected without departing from the true spirit and scope of the novel concept of the invention. It is to be understood that no limitation with respect to specific apparatus illustrated herein is intended or should be inferred. It is, of course, intended to cover by the appended claims all such modifications as fall within the scope of the claims.

What is claimed is:

1. Apparatus for producing an abrasion resistant sheet from linearly crystallizable polypropylene material, said apparatus comprising:
    (a) extrusion means for extruding a sheet of said material at a first temperature at which said material is rendered flowable;
    (b) casting means including plural driven, heat transfer casting rolls for conveying said sheet in a forward direction and for forming said sheet, said casting means including means for maintaining said casting rolls at a temperature below said first temperature whereby said sheet is cooled to a second temperature below said first temperature;
    (c) cooling means including a cooling bath for cooling said sheet to a third temperature below said second temperature;
    (d) heated compression means including heated and driven compression rolls for maintaining said sheet at a fourth temperature, for compressing said sheet, and for causing flow of said material in said sheet in the forward direction so as to reduce the cross-sectional thickness of said sheet;
    (e) tensioning means for placing said sheet under tension in the forward direction in conjunction with said compression rolls so as to cause orientation of the macromolecular chains in said material of said sheet as said sheet exits said compression rolls, said tensioning means including
        (1) one or more chill rolls that are cooled so as to cool said sheet to a fifth temperature below said fourth temperature;
        (2) one or more surface treatment rolls that are heated for reheating a surface of said sheet to a sixth temperature above said fifth temperature and between about 350 degrees F. and about 525 degrees F. for a time period sufficient to cause surface fusion to a depth between about 0.1 mil and about 3 mils but for a time period insufficient to cause fusion in the entire thickness of said sheet; and
        (3) one or more stress relieving rolls heated to a seventh temperature below said sixth temperature so as to cause said sheet to reach a uniform temperature throughout its cross section for effecting stabilization of said sheet;
    whereby the rolls of said tensioning means not only place said sheet under tension in conjunction with said compression rolls for effecting said orientation of the macromolecular chains, but also simultaneously effect said cooling of said sheet, said surface fusion of said sheet, and said stabilization of said sheet.

2. The apparatus in accordance with claim 1 in which said one or more surface treatment rolls include at least two oppositely rotating surface treatment rolls spaced apart along said sheet with one of said surface treatment rolls in contact with one side surface of said sheet for a portion of its circumference and with the other of said surface treatment rolls in contact with the other side surface of said sheet for a portion of its circumference.

3. The apparatus in accordance with claim 1 in which each said surface treatment roll is cylindrical and has a diameter of about 3 inches.

4. The apparatus in accordance with claim 1 in which said tensioning means includes means for driving at least one or more of said chill rolls, said surface treatment rolls, and said stress-relieving rolls to rotate at a greater surface velocity than said compression rolls to effect the placement of said sheet under tension.

5. The apparatus in accordance with claim 4 in which said chill rolls are driven to rotate at a greater surface velocity than said compression rolls for effecting placement of said sheet under tension in the range of between about 10 and about 350 pounds per inch of sheet width.

6. The apparatus in accordance with claim 1 in which said compression rolls are heated to be maintained at a temperature in the range of between about 100 degrees F. and about 220 degrees F.

7. The apparatus in accordance with claim 1 in which each said surface treatment roll is fabricated from aluminum or cold rolled steel and defines passages permitting the circulation of a heat transfer fluid at a temperature of between about 350 degrees F. and about 700 degrees F.

8. The apparatus in accordance with claim 1 in which said stress-relieving rolls include means for heating each said stress-relieving roll to said seventh temperature at about 300 degrees F.

* * * * *